United States Patent
Cho

(10) Patent No.: US 7,630,215 B2
(45) Date of Patent: Dec. 8, 2009

(54) POWER APPARATUS AND METHOD TO PROVIDE HIGH VOLTAGE

(75) Inventor: Jong-hwa Cho, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 806 days.

(21) Appl. No.: 10/321,632

(22) Filed: Dec. 18, 2002

(65) Prior Publication Data

US 2006/0113983 A1    Jun. 1, 2006

(30) Foreign Application Priority Data

May 27, 2002    (KR) ................ 2002-29310

(51) Int. Cl.
  *H02M 3/335*    (2006.01)
(52) U.S. Cl. .................. 363/21.01; 363/61; 323/207
(58) Field of Classification Search .............. 363/21.04, 363/21.1, 21.09, 21.11, 50, 55, 56.01, 60, 363/61, 21.01, 21.02, 21.12; 323/222, 207, 323/282–286; 327/552–554
See application file for complete search history.

(56) References Cited

U.S. PATENT DOCUMENTS

| | | | | |
|---|---|---|---|---|
| 5,023,518 A | * | 6/1991 | Mans et al. ................ | 315/219 |
| 5,371,439 A | * | 12/1994 | Griffin .................... | 315/209 R |
| 5,801,516 A | * | 9/1998 | Rice et al. ................... | 322/37 |
| 5,986,241 A | * | 11/1999 | Funahashi .................. | 219/497 |
| 6,424,207 B1 | | 7/2002 | Johnson | |
| 6,476,673 B2 | * | 11/2002 | Takagishi ................... | 330/10 |
| 6,489,841 B2 | * | 12/2002 | Takagishi ................... | 330/10 |
| 6,525,684 B2 | * | 2/2003 | Tsujikawa .................. | 341/155 |
| 6,891,342 B2 | * | 5/2005 | Nakamura et al. ........... | 318/77 |

FOREIGN PATENT DOCUMENTS

| | | |
|---|---|---|
| JP | 7-274031 | 10/1995 |
| JP | 10-201229 | 1/1998 |

* cited by examiner

*Primary Examiner*—Rajnikant B Patel
(74) *Attorney, Agent, or Firm*—Staas & Halsey LLP

(57) ABSTRACT

A power apparatus and method thereof include first and second signal processing units. The first signal processing unit filters and adjusts a first inputted PWM signal in a predetermined bandwidth to set a reference potential. The second signal processing unit compares the reference potential with a second inputted PWM signal, varies a power to be output according to a result of the comparison, converts the power into a high power, and outputs the converted power.

13 Claims, 4 Drawing Sheets

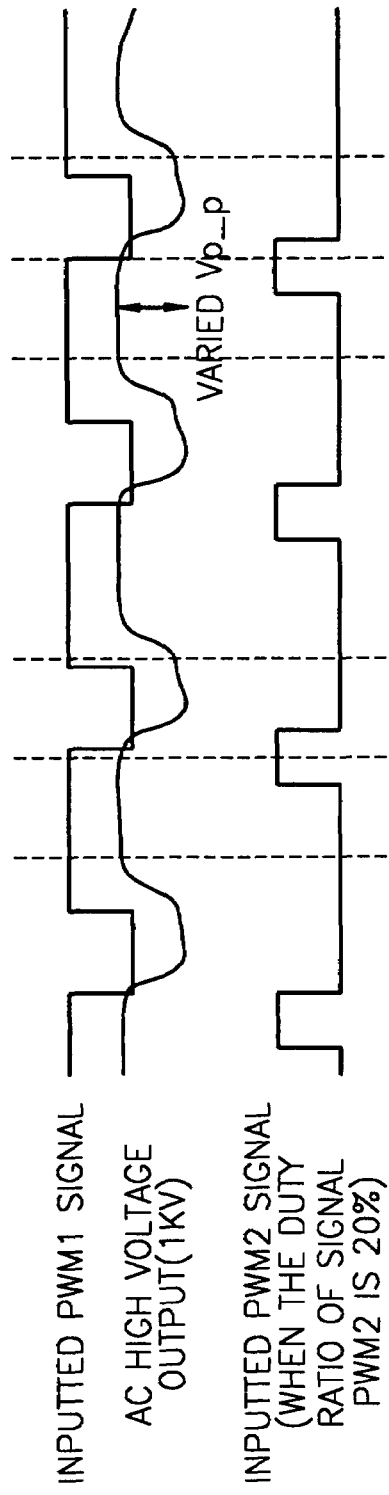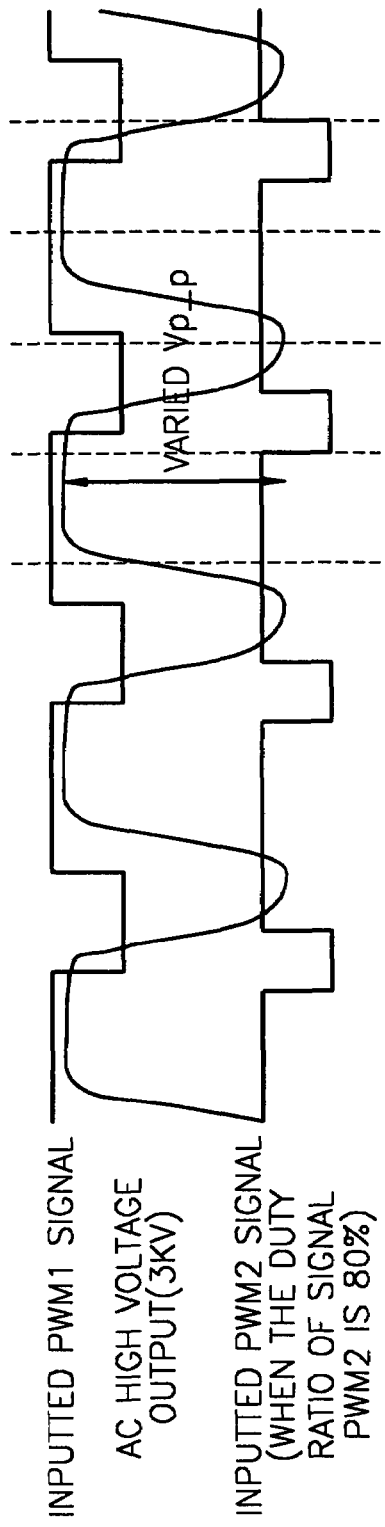

POWER APPARATUS AND METHOD TO PROVIDE HIGH VOLTAGE

CROSS-REFERENCE TO RELATED APPLICATIONS

This application claims the benefit of Korean Application No. 2002-29310 filed May 27, 2002 in the Korean Intellectual Property Office, the disclosure of which is incorporated herein by reference.

BACKGROUND OF THE INVENTION

1. Field of the Invention

The present invention relates to a power generator, and more particularly, to a power apparatus and method thereof to provide a high voltage by which a user varies power supplied by a power generator according to an externally-applied input.

2. Description of the Related Art

FIG. 1 is a block diagram illustrating a structure of a conventional power apparatus to provide a high voltage. Referring to FIG. 1, the conventional power apparatus to provide the high voltage includes a pulse width modulation (PWM) inputting unit 100 which receives a signal PWM from a CPU (not shown) so as to output an AC high voltage, a comparator 101 which compares the PWM signal with a reference potential, a switching controller 102 which forms a compared output signal to a V2 potential, a TRANS 103 which converts the output signal of the switching controller 102 into the high voltage, and a final outputting unit 104 which outputs the high voltage-converted signal.

If the signal PWM is inputted to the comparator 101 from the CPU, the comparator 101 compares the signal PWM with the reference potential that is divided by resistors R3 and R4, and generates the compared output signal. The compared output signal has the same shape as that of the signal PWM, and the switching controller 102 generates a signal having the V2 potential by performing an ON/OFF operation of a transistor Q1 in response to the compared output signal. Thereafter, the signal generated by the switching controller 102 is amplified by the TRANS 103 and output through a final output terminal of the final outputting unit 104.

The conventional power apparatus to provide the high voltage amplifies the inputted PWM signal and supplies the amplified PWM signal to a development unit, with a duty cycle (%), which varies with the CPU. However, as shown in FIG. 2, an AC output potential Vp-p is fixed according to the reference potential that is set to the resistor R3 and the resistor R4. In order to adjust the output potential, a variable resistor should be connected to the resistors R3 and R4 such that the reference potential can be varied. When the apparatus is in operation, it is impossible to automatically vary the resistors R3 and R4. In the case of a mono laser beam printer, a fixed output with the AC high voltage can be adapted to the conditions of a development process. In the case of a color laser beam printer, due to a more complicated process environment and conditions, a power apparatus by which a user voluntarily varies the AC output potential Vp-p is required.

SUMMARY OF THE INVENTION

In accordance with an aspect of the present invention, there is provided a power apparatus to provide a high voltage, by which a concentration development of a color laser beam printer can be effectively adjusted and picture quality of the color laser beam printer can be effectively improved, which is performed by varying an output potential according to an externally-applied input in an AC high voltage fixed output circuit that is used in a non-contact development method of a conventional laser printer.

Accordingly, in accordance with an aspect of the present invention, there is provided a power apparatus to provide a voltage. The apparatus includes a first signal processing unit filtering and adjusting a first inputted PWM signal in a predetermined bandwidth to set a reference potential; and a second signal processing unit comparing the reference potential with a second inputted PWM signal, varying a power to be output according to a result of the comparison, converting the power into a high power, and outputting the converted power.

In accordance with an aspect of the present invention, the first PWM signal is adjusted to a predetermined duty cycle and inputted to the first signal processing unit.

Further, the first signal processing unit may include a filter filtering the first inputted PWM signal in the predetermined bandwidth and outputting the first PWM signal at a DC level; and a reference potential setting unit dividing a voltage of the first PWM signal having the DC level and setting the reference potential.

The second signal processing unit may include a comparator comparing the reference potential with the second inputted PWM signal and outputting a compared result indicative thereof; a switching unit switching the power to be output according to the compared result; and a converting unit converting the switched output power into the high power.

In accordance with an aspect of the present invention, there is provided a power apparatus to provide an amplified voltage, the apparatus including: an inputting unit receiving first and second signals; an RC low pass filter (LPF) low-pass filtering the second signal and outputting the filtered second signal at a DC level; a comparator dividing a voltage of the second signal having the DC level to set a reference potential, comparing the reference potential with the first signal and outputting a result indicative thereof, and converting and outputting a peak-to-peak of the first signal according to the result; a switching controller switching a potential V2 to be output as the peak-to-peak of the first signal; and a TRANS amplifying the pulse waveform of the potential V2 from the switching controller and outputting the amplified potential V2 as the amplified voltage.

In accordance with an aspect of the present invention, there is provided a method of a power apparatus to provide a voltage, the method including: filtering and adjusting a first inputted PWM signal in a predetermined bandwidth to set a reference potential; comparing the reference potential with a second inputted PWM signal; varying a power to be output according to a result of the comparison; converting the power into an amplified power; and outputting the converted power.

In accordance with an aspect of the present invention, there is provided a method of a power apparatus to provide a high voltage, the apparatus including: receiving first and second signals; low-pass filtering the second signal and outputting the filtered second signal at a DC level; dividing a voltage of the second signal having the DC level to set a reference potential; comparing the reference potential with the first signal and outputting a result indicative thereof; converting and outputting a peak-to-peak of the first signal according to the result; switching a potential V2 to be output as the peak-to-peak of the first signal; and amplifying the pulse waveform of the potential V2 and outputting the amplified potential V2.

These together with other aspects and advantages which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and other objects and advantages of the invention will become apparent and more readily appreciated from the following description of the embodiments, taken in conjunction with the accompanying drawings of which:

FIGS. 4A and 4B are waveform diagrams illustrating a varied output potential in the apparatus of FIG. 3.

DETAILED DESCRIPTION OF THE INVENTION

Figure 1:
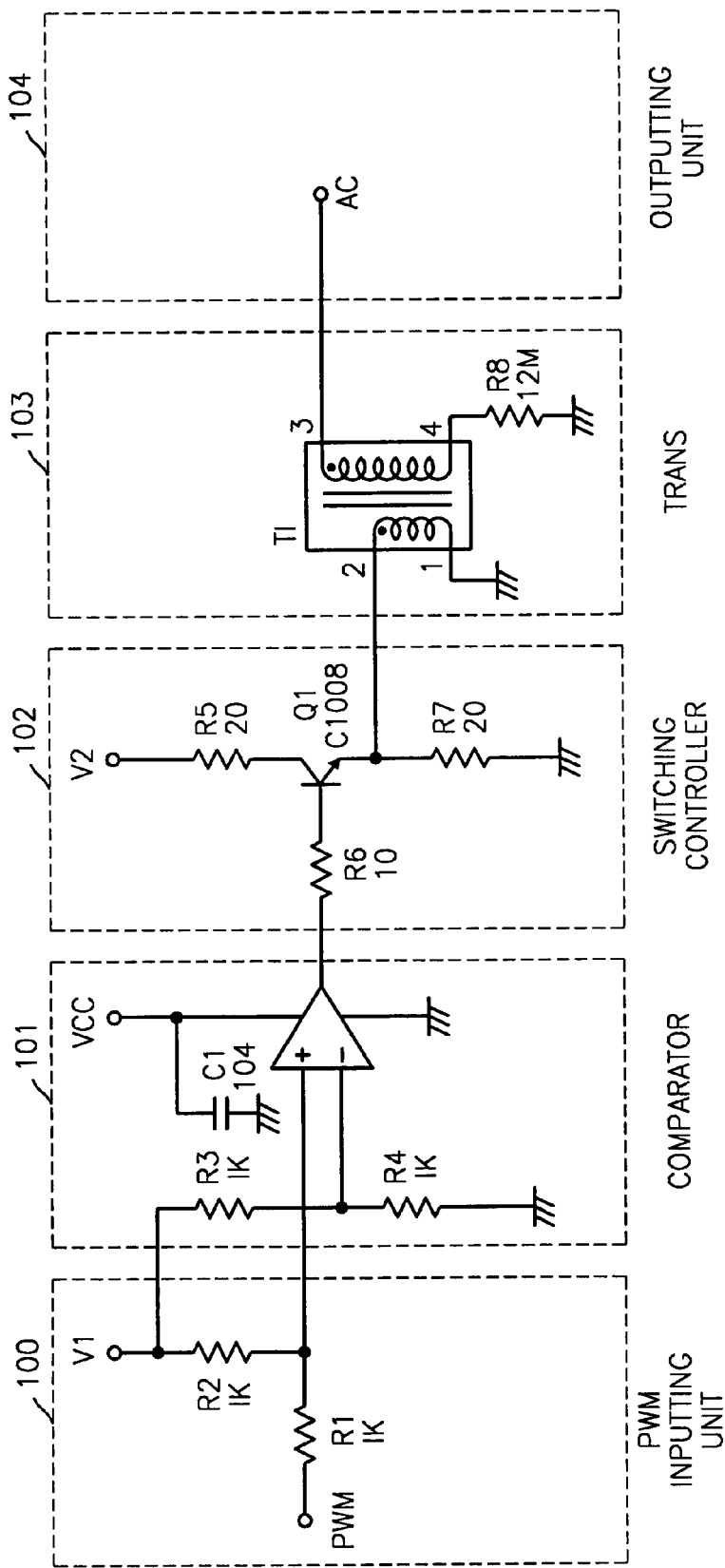
FIG. 1 is a block diagram illustrating a structure of a conventional power apparatus to provide a high voltage.
Figure 2:
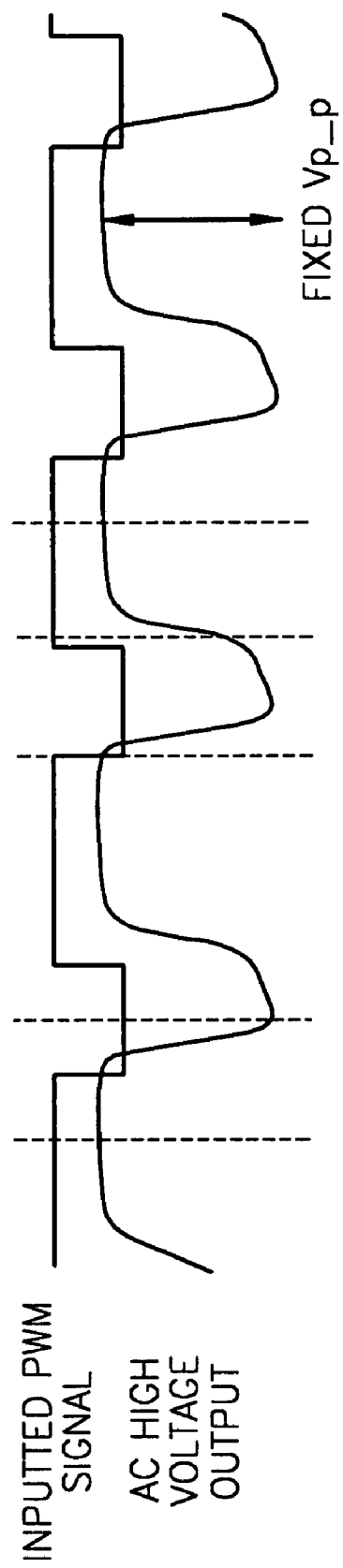
FIG. 2 is a waveform diagram illustrating a fixed output potential of the apparatus of FIG. 1.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 3:
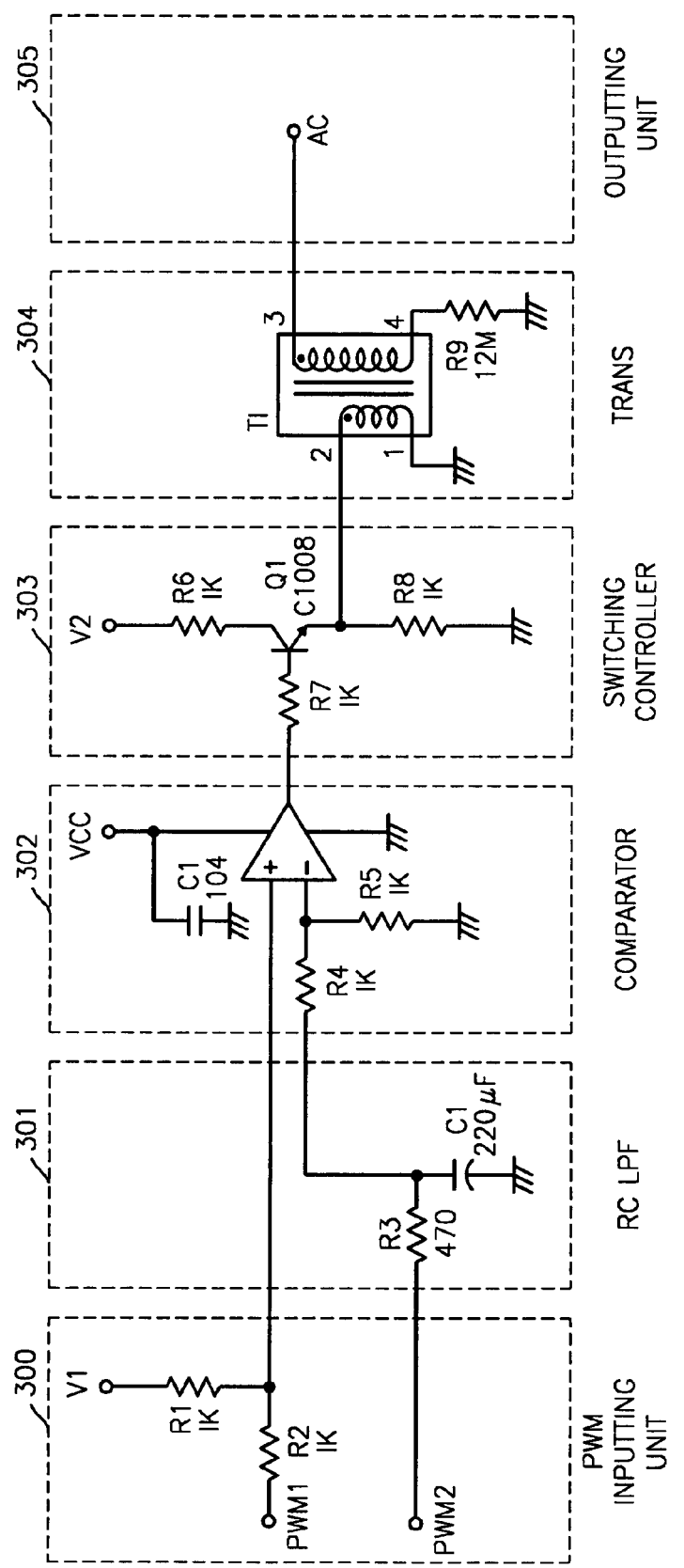
FIG. 3 is a block diagram illustrating a structure of a power apparatus to provide the high voltage according to an aspect of the present invention.

FIG. 3 is a block diagram illustrating a structure of a power apparatus to provide a high voltage, according to an aspect of the present invention. Referring to FIG. 3, the power apparatus to provide the high voltage, according to an aspect of the present invention, includes a PWM inputting unit 300 which receives signals PWM1 and PWM2 from a CPU (not shown), an RC low pass filter (LPF) 301 which low-pass filters the signal PWM2 and outputs the filtered PWM2 signal at a DC level, a comparator 302 which sets a reference potential by dividing a voltage of the signal PWM2 having the DC level, compares the reference potential with the signal PWM1 and converts and outputs a peak-to-peak of the signal PWM1 according to a result of the comparison, a switching controller 303 which switches a potential V2 to be output as the signal PWM1 from the comparator 302, a TRANS 304 which converts the potential V2 from the switching controller 303 into a high potential, and an outputting unit 305.

Hereinafter, the present invention will be described with reference to FIG. 3 in greater detail.

The CPU outputs the signals PWM1 and PWM2 to generate the high voltage power to the PWM inputting unit 300. In this case, the signal PWM2 is varied at a predetermined duty cycle so as to set the reference potential. In an aspect of the present invention, in FIG. 4A, the CPU adjusts the duty cycle of the signal PWM2 to 20% and outputs the signal PWM2 to the PWM inputting unit 300. In FIG. 4B, the CPU adjusts the duty cycle of the signal PWM2 to 80% and outputs the signal PWM2 to the PWM inputting unit 300.

The RC LPF 301 low-pass filters the signal PWM2 that is varied at a predetermined duty cycle through a resistor R3 and a capacitor C1. The signal PWM2, filtered by the RC LPF 301, is converted into the DC level and outputted.

The comparator 302 divides the voltage of the signal PWM2 having the DC level through resistors R4 and R5 in order to generate the reference potential. The comparator 302 compares the reference potential with the signal PWM1 and converts and outputs the peak-to-peak of the signal PWM1 according to the result of the comparison.

The switching controller 303 switches the potential V2 to be output as the signal PWM1 having the converted peak-to-peak output from the comparator 302. The signal PWM1 having the converted peak-to-peak is a control signal used to control an on/off switching of a transistor Q1 such that the potential V2 to be output is switched in response to the control signal and a pulse waveform having the potential V2 is generated.

The TRANS 304 amplifies the pulse waveform of the potential V2 output from the switching controller 303 and applies the amplified potential V2 to a development unit (not shown) through the outputting unit 305.

FIGS. 4A and 4B are waveform diagrams illustrating that the output potential V2 varies in response to the PWM2 signal. FIG. 4A illustrates an AC high voltage output (V2 peak-to-peak) output when the duty cycle of the signal PWM2 is 20%, and FIG. 4B illustrates the AC high voltage output (V2 peak-to-peak) output when the duty cycle of the signal PWM2 is 80%. It is apparent from FIGS. 4A and 4B that the output of the potential V2 can be varied by varying the duty cycle of the signal PWM2.

As described above, an output potential can be varied by varying a reference potential of a comparator in a power apparatus, which contributes to adjust effectively a concentration development of a color laser beam printer. Further, varying the output potential improves effectively a picture quality of the color laser beam printer having complicated process settings and conditions, and flexibly adapts to a printing environment by applying a PWM input to terminals (+) and (−) of a comparator.

While this invention has been particularly shown and described with reference to preferred embodiments thereof, it will be understood by those skilled in the art that various changes in form and details may be made therein without departing from the spirit and scope of the invention as defined by the appended claims and equivalents thereof.

What is claimed is:

1. A power apparatus to provide an amplified voltage, the apparatus comprising:
   a first unit which filters and adjusts a first inputted pulse width modulation (PWM) voltage signal in a predetermined bandwidth to set a reference potential;
   a second unit which compares the reference potential with a second inputted PWM voltage signal, varies a voltage to be amplified according to a result of the comparison, amplifies the voltage, and outputs the amplified voltage; and
   a filter which filters the first inputted PWM voltage signal in the predetermined bandwidth and outputs the first inputted PWM voltage signal at a direct current (DC) level;
   wherein the second inputted PWM voltage signal is an uncombined signal,
   wherein the first PWM voltage signal is adjusted to a predetermined duty cycle and inputted to the first unit.

2. The apparatus of claim 1, wherein the first unit comprises:
   a reference potential setting unit which divides a voltage of the first inputted PWM voltage signal having the DC level and setting the reference potential.

3. The apparatus of claim 1, wherein varying voltage contributes to adjust a concentration development of a laser beam printer.

4. The apparatus of claim 1, wherein varying voltage improves a picture quality of a laser beam printer having process settings and conditions.

5. A power apparatus to provide an amplified voltage, the apparatus comprising:
an inputting unit which receives first and second signals;
a low pass filter (LPF) low-pass filtering the second signal and outputting the filtered second signal at a direct current (DC) level;
a comparator which divides a voltage of the second signal having the DC level to set a reference potential, compares the reference potential with the first signal and outputting a result indicative thereof, and converts and outputs a peak-to-peak of the first signal according to the result;
a switching controller which switches a potential to be output as the peak-to-peak of the first signal; and
a transformer which amplifies the pulse waveform of the potential from the switching controller and outputs the amplified potential as the amplified voltage,
wherein the first and second signals are first pulse width modulated signal and second pulse width modulated signal, respectively and the first signal is an uncombined signal,
wherein the second signal is varied at a predetermined duty cycle to set the reference potential, and the potential varies in response to a variance of a duty cycle of the second signal.

6. The apparatus of claim 5, wherein the peak-to-peak of the first signal is a control signal used to control an on/off switching of a transistor in the switching controller so that the potential to be output is switched in response to the control signal and a pulse waveform having the potential is generated.

7. The apparatus of claim 5, wherein the apparatus is adapted to a printing apparatus by inputting pulse modulated signals to terminals (+) and (−) of the comparator.

8. A method of a power apparatus to provide an amplified voltage, the method comprising:
filtering and adjusting a first inputted pulse width modulation (PWM) voltage signal in a predetermined bandwidth to set a reference potential;
comparing the reference potential with a second inputted PWM voltage signal, wherein the second inputted PWM voltage signal is an uncombined signal;
varying a voltage to be output according to a result of the comparison;
converting the voltage into amplified voltage;
outputting the amplified voltage;
adjusting the first PWM voltage signal to a predetermined duty cycle; and
filtering the first inputted PWM voltage signal in the predetermined bandwidth to output the first PWM voltage signal at a direct current (DC) level.

9. The method of claim 8, further comprising:
dividing a voltage of the first PWM voltage signal having the DC level to set the reference potential.

10. The method of claim 8, further comprising:
comparing the reference potential with the second inputted PWM voltage signal and outputting a compared result indicative thereof;
switching the voltage to be output according to the compared result; and
converting the switched output voltage into the amplified voltage.

11. A method of a power apparatus to provide an amplified voltage, the apparatus comprising:
receiving first and second signals;
low-pass filtering the second signal and outputting the filtered second signal at a direct current (DC) level;
dividing a voltage of the second signal having the DC level to set a reference potential;
comparing the reference potential with the first signal and outputting a result indicative thereof;
converting and outputting a peak-to-peak of the first signal according to the result;
switching a potential to be output as the peak-to-peak of the first signal; and
amplifying the pulse waveform of the switched potential and outputting the amplified potential as the amplified voltage,
wherein the first and second signals are first pulse width modulated signal and second pulse width modulated signal, respectively, and the first signal is an uncombined signal,
varying the second signal at a predetermined duty cycle to set the reference potential; and
varying the output potential in response to a variance of a duty cycle of the second signal.

12. The apparatus of claim 1, wherein the second inputted PWM signal includes high frequency components.

13. The apparatus of claim 12, wherein the varying of the voltage to be output comprises varying the voltage during an operation of the apparatus.

* * * * *

UNITED STATES PATENT AND TRADEMARK OFFICE
CERTIFICATE OF CORRECTION

| | |
|---|---|
| PATENT NO. | : 7,630,215 B2 |
| APPLICATION NO. | : 10/321632 |
| DATED | : December 8, 2009 |
| INVENTOR(S) | : Jong-hwa Cho |

Page 1 of 1

It is certified that error appears in the above-identified patent and that said Letters Patent is hereby corrected as shown below:

Column 6, Line 43, change "apparatus of claim 12," to --method of claim 8,--.

Signed and Sealed this

Ninth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,630,215 B2 Page 1 of 1
APPLICATION NO. : 10/321632
DATED : December 8, 2009
INVENTOR(S) : Jong-hwa Cho It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1251 days.

Signed and Sealed this

Second Day of November, 2010

David J. Kappos
*Director of the United States Patent and Trademark Office*